US006930978B2

(12) United States Patent
Sharp et al.

(10) Patent No.: US 6,930,978 B2
(45) Date of Patent: Aug. 16, 2005

(54) SYSTEM AND METHOD FOR TRAFFIC MANAGEMENT CONTROL IN A DATA TRANSMISSION NETWORK

(75) Inventors: Clifford F. Sharp, Del Mar, CA (US); Susan Pittman Dark, Dallas, TX (US)

(73) Assignee: Deep Nines, Inc., Dallas, TX (US)

( * ) Notice: Subject to any disclaimer, the term of this patent is extended or adjusted under 35 U.S.C. 154(b) by 807 days.

(21) Appl. No.: 09/875,319

(22) Filed: Jun. 6, 2001

(65) Prior Publication Data

US 2002/0131366 A1 Sep. 19, 2002

Related U.S. Application Data

(63) Continuation-in-part of application No. 09/572,112, filed on May 17, 2000.

(51) Int. Cl.[7] .............................................. H04L 12/26
(52) U.S. Cl. ...................................... 370/229; 370/401
(58) Field of Search ................................ 370/229–235, 370/252, 218, 232, 255, 389, 401, 402, 363, 368, 371, 374, 378, 379, 381, 382, 383, 386, 428, 429; 709/224, 102, 105, 319, 226, 229

(56) References Cited

U.S. PATENT DOCUMENTS

| 5,319,776 A | 6/1994 | Hile et al. |
|---|---|---|
| 5,414,650 A | 5/1995 | Hekhuis |
| 5,623,601 A | 4/1997 | Vu |
| 5,649,095 A | 7/1997 | Cozza |
| 5,787,253 A | 7/1998 | McCreery et al. |
| 5,799,002 A | 8/1998 | Krishnan |
| 5,835,726 A | 11/1998 | Shwed et al. |
| 5,913,041 A | 6/1999 | Ramanathan et al. |
| 6,052,788 A | 4/2000 | Wesinger, Jr. et al. |
| 6,061,798 A | 5/2000 | Coley et al. |
| 6,098,172 A | 8/2000 | Coss et al. |
| 6,119,165 A | 9/2000 | Li et al. |
| 6,119,236 A | 9/2000 | Shipley |
| 6,182,226 B1 | 1/2001 | Reid et al. |
| 6,205,551 B1 | 3/2001 | Grosse |
| 6,219,786 B1 | 4/2001 | Cunningham et al. |
| 6,222,856 B1 | 4/2001 | Krishnan et al. |
| 6,246,687 B1 * | 6/2001 | Siu ........................ 370/395.71 |
| 6,263,444 B1 | 7/2001 | Fujita |
| 6,279,113 B1 | 8/2001 | Vaidya |
| 6,298,445 B1 | 10/2001 | Shostack et al. |
| 6,301,668 B1 | 10/2001 | Gleichauf et al. |
| 6,321,336 B1 | 11/2001 | Applegate et al. |
| 6,327,625 B1 * | 12/2001 | Wang et al. ................. 709/235 |
| 6,513,122 B1 | 1/2003 | Magdych et al. |

FOREIGN PATENT DOCUMENTS

| JP | 08 186569 | 7/1996 |
|---|---|---|
| WO | WO 00/11841 | 3/2000 |
| WO | WO 01/16664 | 3/2001 |

OTHER PUBLICATIONS

PCT International Search Report (PCT/US02/17426) dated Feb. 28, 2003.

(Continued)

*Primary Examiner*—Wellington Chin
*Assistant Examiner*—Brenda Pham
(74) *Attorney, Agent, or Firm*—Fulbright & Jaworski LLP

(57) ABSTRACT

A traffic management system sniffs data arriving at any point in a system. The sniffer operates to remember certain parameters pertaining to the data. When the amount of data arriving at the point begins to reach a critical level (usually dependent upon data processing capability associated with that point), the system begins to remove (and share) subsequent arriving data based, in part, upon the remembered parameters of recently received data. Data that is stored is returned to the system when the critical threshold recedes.

41 Claims, 7 Drawing Sheets

OTHER PUBLICATIONS

PCT Search Report dated Mar. 26, 2002 (PCT/US01/15108).

Ishibashi, H. et al. "A Protection Method against Unauthorized Access and Address Spoofing for Open Network Access System." IEEE, US, vol. 1 of 2. Conf. 8, Aug. 26, 2001, pp. 10–13.

Kanlayasiri, Urupoj, et al. "Detecting Denial of Service using BENEF Model: An Alternative Approach," Applied Network Research Group Department of Computer Engineering, Kasetsart University, Chatuchak, Bangkok, Thailand, Feb. 2001, pp. 1–8.

Whalen, Sean, An Introduction to Arp Spoofing. Revision 1, Apr. 2001, pp. 1–6.

"IP–Spoofing Demystified." Phrack Magazine, vol. 7, Issue 48, File 14 of 18, Jun. 1996, pp. 1–9.

"Sleuth9." Datamation, [on–line] http://products.datamation.com/security/security/1011891069.html, retrieved on May 7, 2003. Pages 1&2.

Partial International Search Report, dated May 26, 2003.

* cited by examiner

| 0 | 1 | 2 | 3 | 4 | 5 | 6 |
|---|---|---|---|---|---|---|
| MAIN POSIX PTS 2 | IP1 | CRUNCH | DETER CHOKE | WISH SUM LOWER | 2 DATABASE FILTERS | SYNCH SHARED RESOURCES |

FIG. 7

| | BYTES | BYTESPTS | BYTESLASTPTS | ACCUMBYTESLAST | IPDETECTIONDATE | | IPLASTNOTICEDATE | |
|---|---|---|---|---|---|---|---|---|
| 1 | 1,107,624 | 40 | 40 | 18,107,624 | 2/14/01 | 10:14:15 AM | 2/14/01 | 2:37:27 AM |
| 2 | 1,074,749 | 999 | 999 | 1,074,749 | 2/14/01 | 10:15:01 AM | 2/14/01 | 2:42:15 AM |
| 3 | 833,551 | 41 | 41 | 833,551 | 2/14/01 | 10:13:46 AM | 2/14/01 | 2:44:55 AM |
| 4 | 477,808 | 71,379 | 71,379 | 447,808 | 2/14/01 | 10:10:26 AM | 2/16/01 | 10:48:49 AM |
| 5 | 300,426 | 38,015 | 38,015 | 300,426 | 2/14/01 | 2:30:48 AM | 2/14/01 | 2:30:51 AM |
| 6 | 201,787 | 43,830 | 43,830 | 201,787 | 2/14/01 | 10:08:36 AM | 2/16/01 | 10:48:34 AM |
| 7 | 69,169 | 2,950 | 2,950 | 69,169 | 2/14/01 | 10:10:25 AM | 2/16/01 | 10:45:55 AM |
| 8 | 54,450 | 80 | 80 | 54,450 | 2/14/01 | 11:18:14 AM | 2/14/01 | 12:19:57 PM |
| 9 | 52,471 | 5,665 | 5,665 | 52,471 | 2/14/01 | 10:08:38 AM | 2/16/01 | 10:48:35 AM |
| 10 | 30,118 | 2,170 | 2,170 | 30,118 | 2/14/01 | 12:35:00 PM | 2/14/01 | 12:50:22 PM |

| | CHOKEBYTES | CHOKELEVEL | ACTIVE | CHOKESTARTDATE | | CHOKEENDDATE | |
|---|---|---|---|---|---|---|---|
| 1 | 9,325 | 2 | 0 | 2/14/01 | 10:17:24 AM | 2/14/01 | 10:37:22 AM |
| 2 | 40,425 | 2 | 0 | 2/14/01 | 10:17:30 AM | 2/14/01 | 10:37:22 AM |
| 3 | 137,276 | 2 | 0 | 2/14/01 | 10:17:39 AM | 2/14/01 | 10:37:22 AM |
| 4 | 23,336 | 2 | 0 | 2/14/01 | 10:17:47 AM | 2/14/01 | 10:37:22 AM |
| 5 | 1,540 | 2 | 0 | 2/14/01 | 10:17:52 AM | 2/14/01 | 10:37:22 AM |
| 6 | 40 | 2 | 0 | 2/14/01 | 10:17:58 AM | 2/14/01 | 10:37:22 AM |
| 7 | 46,519 | 2 | 0 | 2/14/01 | 10:18:03 AM | 2/14/01 | 10:37:22 AM |
| 8 | 118,529 | 2 | 0 | 2/14/01 | 10:18:14 AM | 2/14/01 | 10:37:22 AM |
| 9 | 148,551 | 2 | 0 | 2/14/01 | 10:18:21 AM | 2/14/01 | 10:37:22 AM |

SYSTEM AND METHOD FOR TRAFFIC MANAGEMENT CONTROL IN A DATA TRANSMISSION NETWORK

RELATED APPLICATIONS

This application is a Continuation in Part of U.S. patent application Ser. No. 09/572,112 filed May 17, 2000 and entitled "Intelligent Feedback Loop Process Control System," which is herein by reference.

TECHNICAL FIELD

This invention relates to data network control systems and more particularly to a system and method for monitoring and filtering traffic to maintain a constant stream of data flowing in and/or out of a particular location.

BACKGROUND

Data flow in and out of a data source is vital to the proper operation of many enterprises. When this data flow is interrupted, even for the briefest of intervals, a major problem exists. One way to interrupt such data flow is by flooding any communication line (or any network device on the pathway) with so many data packets that the device simply clogs and ceases to function properly. In such a situation, data can be lost, transactions not completed and the flow of commerce halted.

Companies are getting attacked via data flooding by a wide range of flooding mechanisms, including certain types of Denial of Service (DOS) and Distributed Denial of Service (DDOS) attacks that are not specific to an application, but exist in the network.

One known solution to this particular type of problem is manual intervention by a system administrator scrolling on access control list screen to manually select and block an offending IP address.

This, of course, presupposes that the operator even knows which sending IP address(es) is causing the problem. If the rogue sending address keeps changing, the operator (system administrator) is at a loss. The other solutions that we know of are remote intrusion detection sensors that provide manual notification that an attack has been detected and lists the known offending IP address. A third solution is remote monitoring of network conditions. The problem with the solutions to date is the fact that by the time a human can respond to the existing condition, it is already beyond his/her ability to control the traffic and the network is brought down by the intruding traffic overload.

For example, today even assuming a modest speed of, let's say a 1,000 packet/second, about half of the maximum data rate of a T1 channel, the human eye cannot respond that fast to read the IP addresses, digest the information and act before many, many packets enter the system and cause damage. Today a typical enterprise can receive a million hits in an hour, made up of perhaps 4,000,000 or 5,000,000 packets. Such large numbers of packets, when backed up, cause the system to stop functioning.

SUMMARY OF THE INVENTION

The present invention includes a system which implements a three tiered architecture where the database runs on one computer, or across multiple computers, and the kernel and all of its intelligence runs on a separate computer while the applications and management tools run on other computer(s). The system is designed to monitor every tcp/ip packet directed toward a company and to keep track of each packet from each IP address, including all of the bytes of information associated with each packet. The goal of the system and method is to prevent flooding which is defined as a threshold above which data throughput must not go.

If desired, the system can have several threshold's, each dynamically changeable, when a threshold is reached. Threshold, in this context, means that the number of arriving data packets and the accumulated number of bytes of information during a preset time period, (called a primary time slice (PTS)) has met a limit. When this happens certain packets are scanned, captured, and prevented (temporarily) from passing through the system. When the traffic rate falls to the threshold level these captured packets are allowed to then flow through the system. The captured packets are selected based on a comparison of information "sniffed" by the monitor against certain criteria, such as number of packets and the accumulation of bytes per PTS coming from a particular IP address; a known "bad" IP address; and known bad data patterns.

Generally, when it comes to flooding, there are four (or more or less) threshold levels which exist which are percentages of the total maximum band-width of the network. The thresholds can be for example 20, 30, or 40 percent of maximum. If the traffic flow is under the lowest threshold, everything runs smoothly. Once the number of arriving packets and accumulated bytes violate a threshold, the system begins, automatically, the process of choking or holding certain packets. If higher thresholds are violated then more and more severe action is taken, i.e. more and more packet(s) are prevented from flowing through the system.

One embodiment of the system includes several real time displays, or tools, to analyze, manage, and monitor the data bases, the kernel, and the whole system. One visual display of data and addresses shows the packets that have been choked and, optionally could show why. This information can be displayed locally and can be communicated remotely to any terminal or communication device anywhere in the world. Thus, a user, operating from any terminal with the appropriate user ID and password can make adjustments to the system by changing the different parameters allowing more or less data flow. The operator can, if desired, adjust the criteria for choking data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 shows a seven threads of the system working interactively; and

FIGS. 5–8 show various displays used to monitor system operation.

DETAILED DESCRIPTION

Figure 1:
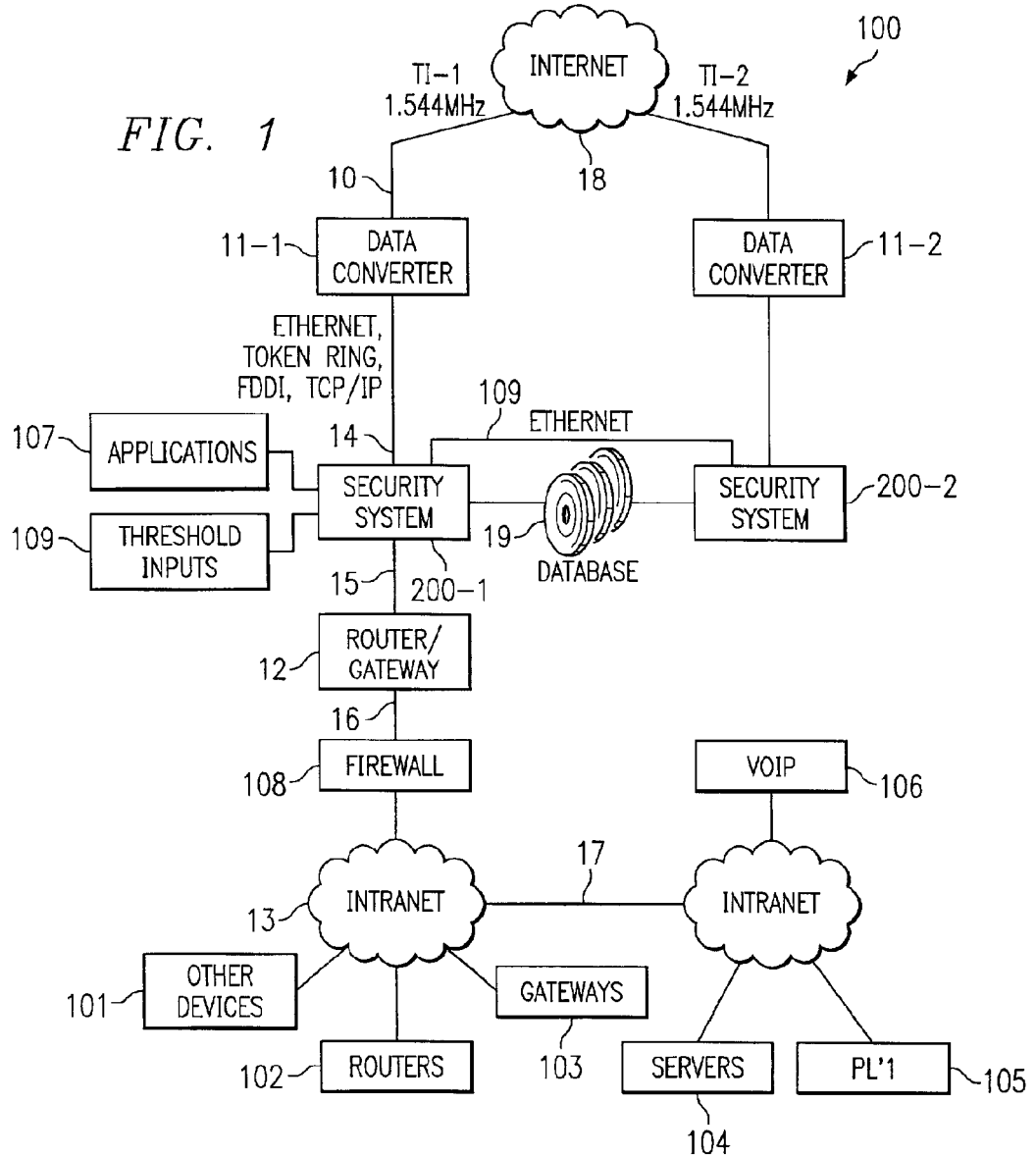
FIG. 1 shows the invention working in context to data flowing to/from a network, such as the internet.

Turning now to FIG. 1, as packets come from internet 18 (or any source), they travel to data converter 11-1 (11-2) through line 10, which could be a T1, T3, OC48 or any other communication media. Data converter 11-1 can be several data converters which take the data packets off the line and convert that data to an "internal" protocol, such as token ring, FDDI, TCP/IP or other protocol desired by an enterprise. These packets then pass to security system 200-1 one medium 14. When the packets arrive at security system 200-1, each packet will be analyzed, as will be discussed hereinafter. Only those medium packets which make their way through security system 200-1 are delivered to router 12 over 15. Router 12 could be a combination router/gateway or, in fact, router 12 and/or firewall 108 could be built directly into security system 200-1 if so desired.

Those packets that manage to make it through security system 200-1 are delivered to enterprise internal (intra) network 13, firewall 108. Connected to intranet 13 can be other intranets, local or remote. For example, intranet 13-N is connected to intranet 13 via medium 17. Connected to any of the intranets can be any type of device such as routers 102, gateways 103, servers 104, PCs 105, voice-over IP, protocol systems (VOIP) 106, or any type of devices .01.

The system is designed having a back up line T1-2 so that, if the user desires, information is always delivered from the external network for example from internet 18, over data lines T1 and T2. The packets that come via T1-2 are processed in a similar way as those coming via T1-1, except they do not pass through security system 200-2 until security system 200-2 gets notified that security system 200-1 is not functioning or overloaded. In such an event the information stops flowing from T1-1 and starts flowing from T1-2. This is a back-up system and security systems 200-1 and 200-2 can, for example, communicate with each other over medium 109. Database 19 advantageously is connected to both systems 200-1 and 200-2 and is used to store the information analyzing every packet that comes via T1-1 or T1-2.

Applications 107 can be remote from security systems 200-1 and 200-2 if desired and, connected via intranet 13, or they can be local to security system 200-1. The preferred arrangement would be for applications 107 to be in a separate CPU from the one processing system 200-1. They can be run from a location via internet 18 if needed. In that case, the information would come in on modem T1-1 and T1-2 as any other information would come in to the system. This, as will be discussed, allows a user to remotely access the system, monitor the system and make changes to the system as desired.

Data from applications 107 is advantageously binary encrypted so when it's run from anywhere, it is difficult to decrypt. As data flows into security system 200-1 (200-2) the packets are analyzed and do not pass to router/Gateway 12 unless they are logged through the system as will be discussed hereinafter.

Figure 2:
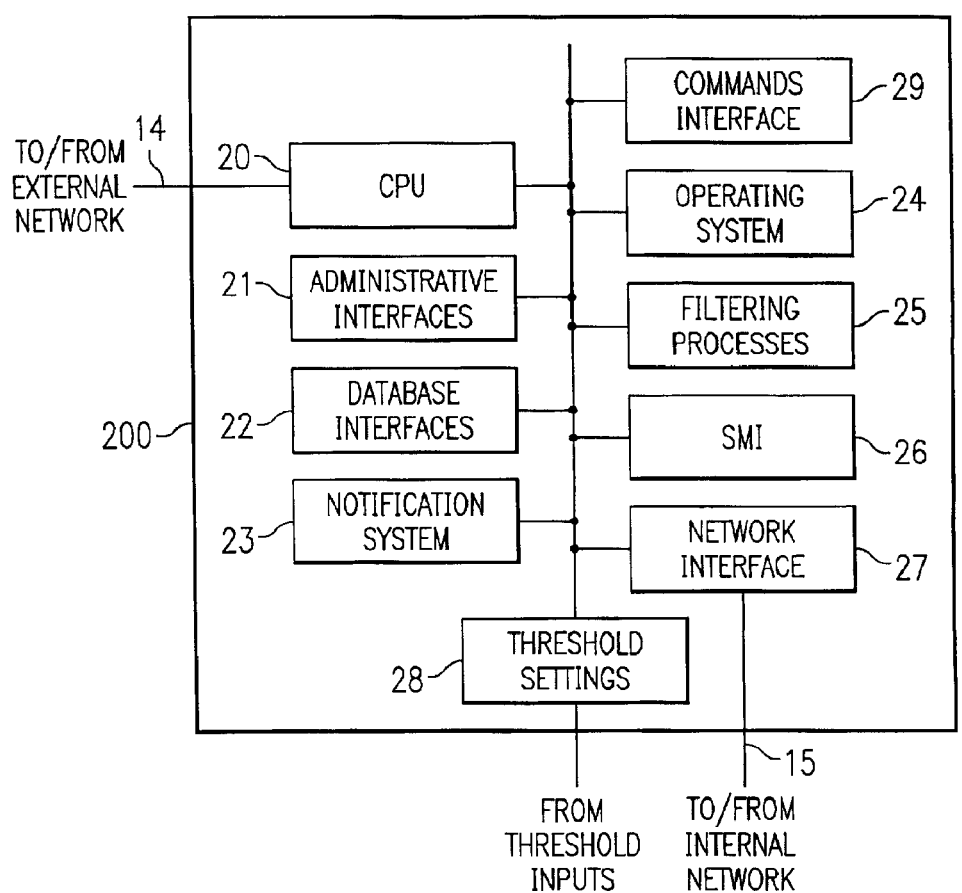
FIG. 2 shows in detail the basic blocks which enable the invention.

FIG. 2 shows a block diagram, by way of example only, of security system 200: Data enters, via medium 14, to CPU interface 20, which advantageously could be a Sun Ultra Computer running operating system 24 which could be Solaris 8. Administrative interfaces 21 in our example are four visual displays; two of which are data base driven and the other two being visual displays of the kernel in real time. Data base interfaces 22 are, in our example, Oracle 8i version 8.1.7.0.0, and contain a number of tables based on Oracle 8 architecture. Notification system 23 is an alarming system that involves sending out e-mail and pager alerts as packets get analyzed and choked. Filtering processes 25 are Solaris 8 loadable kernel modules that actually filter or disallow packets from passing through the system. SMI 26 is self-monitoring intelligence that is continuously monitoring the complete state of security system 200-1 (200-2). Network interface 27 processes data packets to external interface 15 using Sun Fest Ethernet PCI NIC Internet access. Notification system 23 sends pages, e-mail and/or any other message type, advantageously via the SMTP protocol through external interface 14 using, for example the Sun Solaris Mailx program. Threshold settings control 28 allows for fixed and variable settings.

Commands interface is a Unix shell and/or DOS shell command line interface to the system. Interface allows external issue of commands that change the internal configuration parameters of the system. Along with changing the internal configuration, the configuration database is updated simultaneously and automatically. The following is a list of configuration items that can be altered:

Status—tells the system to list all the configuration items that can be altered and their current status;

Email—turn on/off email alerts;

Pager—turn on/off pager alerts;

Iptrack—turn on/off writing to the iptrack database;

Ipchoke—turn on/off writing to ipchoke database;

Ipicmp—turn on/off writing to ipiemp database;

Message—turn on/off message, log reporting and change the message reporting level;

Trace—turn on/off error log reporting and alter the trace level reporting

Ptslice—modify the PTS period; and

Thresholds 1–4—turn on/off each threshold level.

Figure 3:
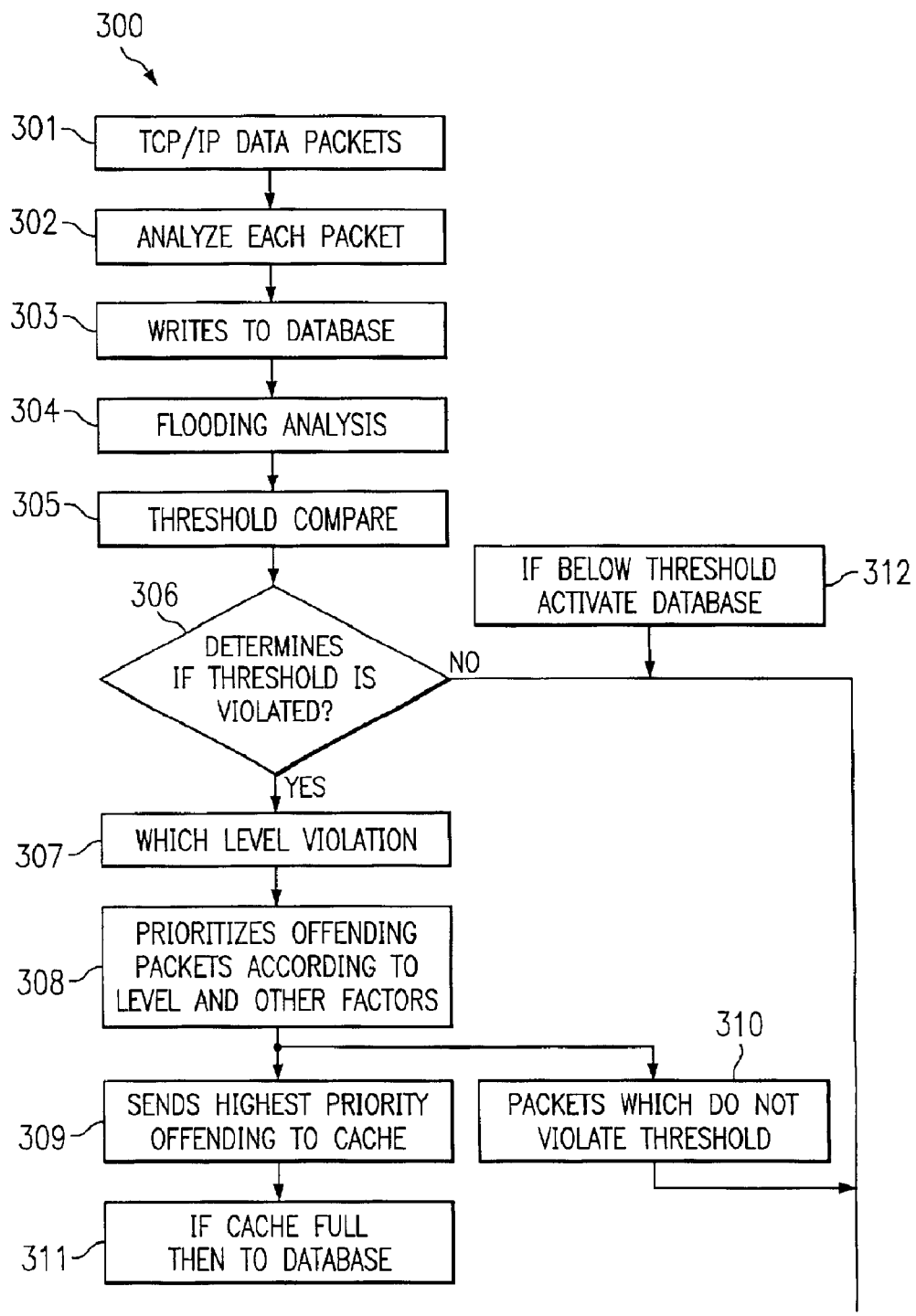
FIG. 3 shows a flow diagram of the system operation.

FIG. 3 shows system diagram 300. Packets enter via box 301 via medium 14 (FIG. 2) and each packet is analyzed. Routine 302 looks at the packet to see if the IP address of the packet has sent any previous bad information. Also a tally is maintained in database 19 (FIG. 1) of how many bytes each packet contains and the number of bytes of the packet is added to the total for that same IP address. The system also keeps track of how the packet size fits with respect to the maximum packet size of the other incoming data. Also tallied are the amount of bytes since the last primary time slice (PTS) has been stored along with, the accumulated bytes for the whole time the system has been running for that IP address. The date when an IP address first sent a packet through the system, along with the date of the last packet is maintained along with the current number of bytes for that PTS all of which are stored in database 19 via routine 303.

Analysis 304 involves determining if the number of packets and the accumulated bytes per IP address over each PTS, taken as a whole, is enough to violate any of the four preset threshold levels.

Analysis 304 also determines, on a continuous basis, if the packet byte accumulation rates warrant the addition or subtraction of IP addresses to the list of chokes as compared to each threshold level and preset packet rate.

Threshold compare 305, compares the number of bytes during the last PTS where it first sorts the total number of bytes to each IP address by descending number of bytes. In other words, the highest number of bytes by IP address gets sorted to the top. If the threshold has been violated box 306, if the total number of bytes that came through for all IP addresses during that PTS is greater than one (or more) of the threshold levels or if the packet rate violates a preset packet rate threshold. When a level of violation happens, 307 a determination is made as to which level has been violated. If any threshold is violated, then certain data packets are choked from flowing through the system.

Once a threshold is violated the system begins to disallow packets from certain IP addresses to pass through the system. Since the system has already and continuously, keeps track of the total bytes as well as the number of packets for every IP address sorted in descending order it now uses that tally to choke a certain percentage of traffic. The system does this by looking at packets from IP addresses that are known to have sent bad packets in the past. If choking only these packets is not enough to bring the bandwidth down below a particular threshold level, the system chokes the next IP address on the list having the largest data volume per PTS. If this total accumulation of bytes as well as the packet rate for this IP address brings total bandwidth down to threshold level then the system stops adding IP addresses to the choke list. If the throughput still remains over threshold, more and more IP addresses are added to the choke list until the proper throughput is achieved.

During this time the system is simultaneously determining if there is a violation of any other thresholds. If the next higher threshold has been violated, then the system goes through the same process, but looking for a higher percentage level to choke. If the system goes down a threshold, then some of the IP addresses on the choke list are removed. Where the threshold levels are lowered, the cached (choked) addresses are allowed through. Once the database and cache are emptied for that threshold level, then if need be, more addresses are removed from the choke list. Process 309 & 311 control storage of data, while process 310 sends unchoked data through the system.

Another process that happens at every threshold level simultaneously is anytime a move up or down in threshold level is made, a determination is made to see if bytes that are currently being choked are still active. If they are active, then we leave them on the choke list at the next higher level. Active means that the IP address has accumulated bytes and/or packets during the last PTS. If that IP address is inactive for a PTS, meaning it has not accumulated any bytes or packets in the last PTS, then it is removed from the choke list before other IP addresses are added or removed.

Two important parameters of the system are 1) threshold percentages and 2) primary time slice. Everything happens brand new for every time slice, which advantageously is two seconds but could set to any length desired. Then the way the system prioritizes how traffic is choked is by determining how many bytes and packets are accumulated, if any, during the last PTS for each IP address.

The reason for checking to see if an IP address is still active is to prevent an attacker from continuing to change IP addresses, which could occur if "dead" IP addresses were not removed quickly from the choke list.

Figures 4, 5:
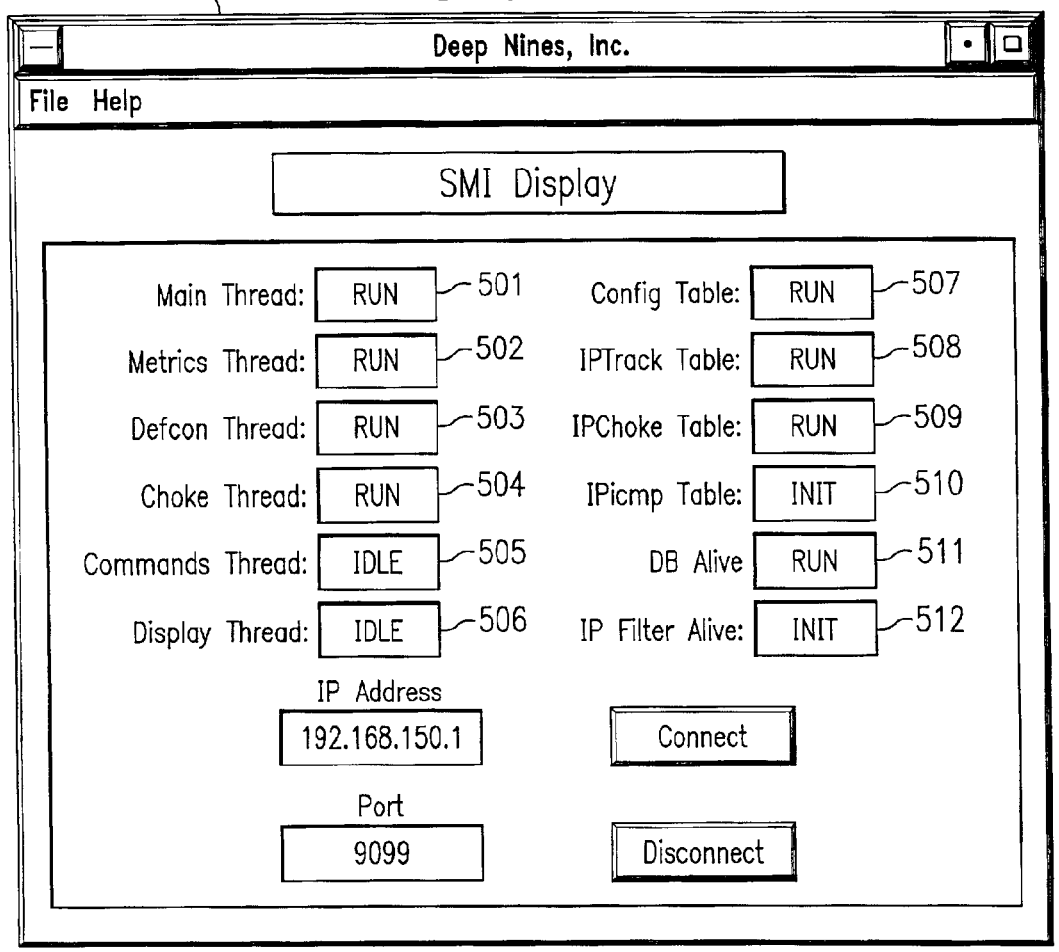

FIG. 4 is a description of what is going on during a primary time slice. There are seven processes operating in the processor for every primary time slice and these processes are repeated at 2 second intervals (assuming a 2 second PTS is selected).

The parameters for disc storage for the database storage can be determined on a customizable level, whether a user needs to store data for an extended period of time beyond the PTS expiration of active or inactive packets. The user could determine the amount of time and volume of data that they need to store and for how long and for how many PTS.

Parameters for database storage and back-up will depend upon the amount of bandwidth that is being recorded and will depend upon when the inactive list is available such as by the hour increments or daily or weekly increments to be backed up to maintain database levels for constant writing during any time of flooding traffic.

FIG. 5 shows Self Monitoring Intelligence (SMI) display 500 shows 12 components (501–512) of the systems states in real-time dynamically. There are four states for every component which can, if desired, be shown in different colors for quicker identification of system status. The colors in parenthesis (optional) are suggested colors.

Down (in red)—the component is down and NOT working—needs HELP.

Init (in blue)—the component is working and has been initialized but is currently NOT active.

Idle (in yellow)—the component is working, initialized, and running but is currently not processing data.

Run (in green)—the component is working, initialized, running, and actively processing data.

Figure 6:
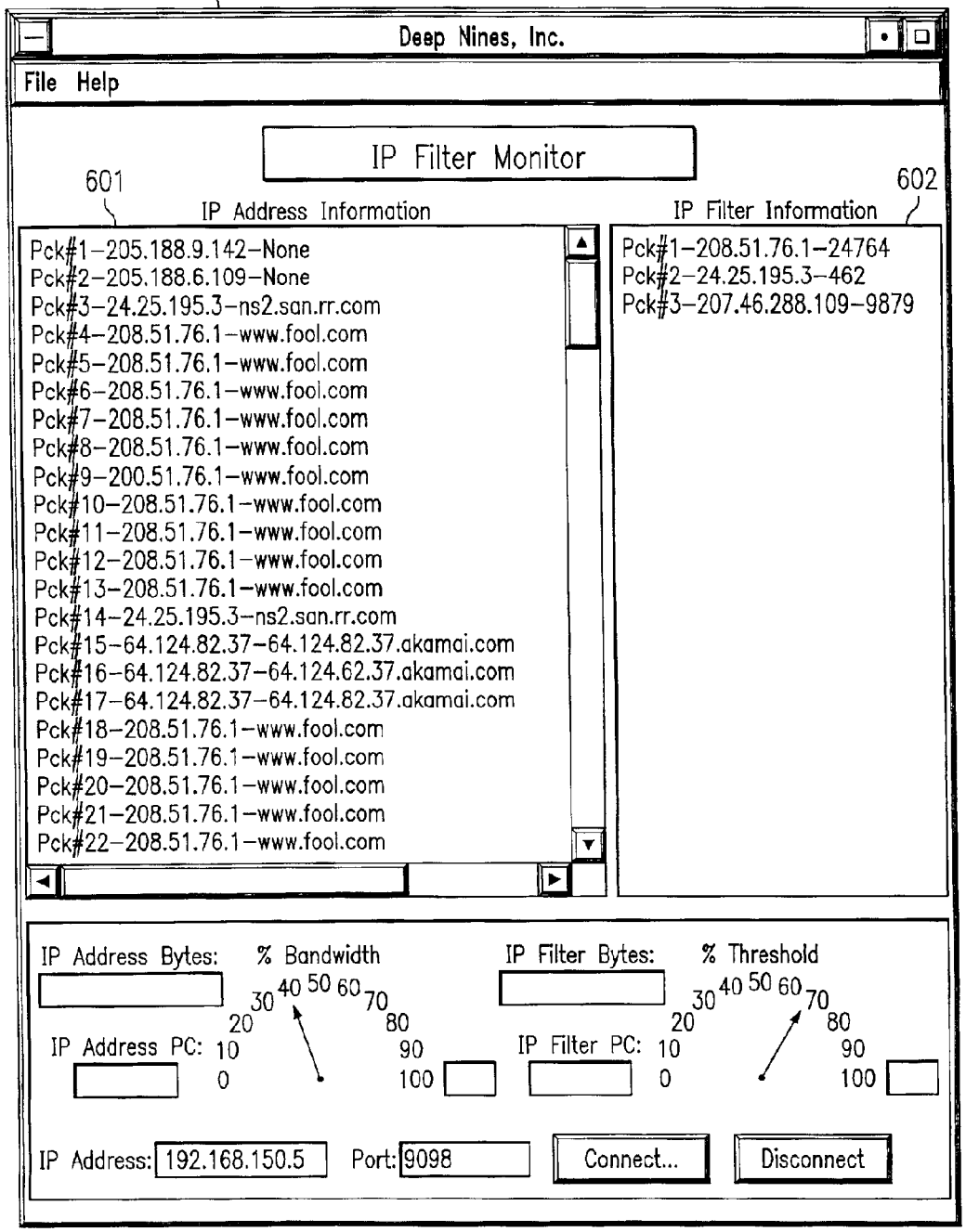

FIG. 6, shows dynamic visual IP Filter monitoring display 600. Table 601 entitled "IP Address Information" is a real-time dynamic list of each and every packet that the system sees on the internet. Table 602 entitled "IP Filter Information" is real-time dynamic list of every single packet that the system chokes.

603 is the total bytes the system has processed starting when the system was initially started.

604 is the total number of packets the system has processed starting when the system was initially started.

605 is the total number of bytes the system has choked starting when the system was initially started.

606 is the total number of packets the system has choked starting when the system was initially started.

FIG. 7, shows visual IP Tracking database management and display 700 which provides more information about each and every IP address that the system maintains. The first two columns of FIG. 7, I will call them 700a, 700b, are not shown.

700a is the IP address.

700b is the domain name associated with column 700a's IP address up to the current PTS.

701 is the total accumulated bytes that has been processed for IP address 700a.

702 is the total accumulated bytes during the current PTS for IP address 701a.

703 is the total accumulated bytes during the last PTS for IP address 701a.

704 is the accumulated bytes for IP address 701a up to the last PTS.

705 is the date in which the IP address 701a was first logged.

706 is the date the IP address 701a was last updated.

801 is a pull-down menu of data which is associated with this system's configurations. There can be many different configurations associated with this system.

Figure 8:
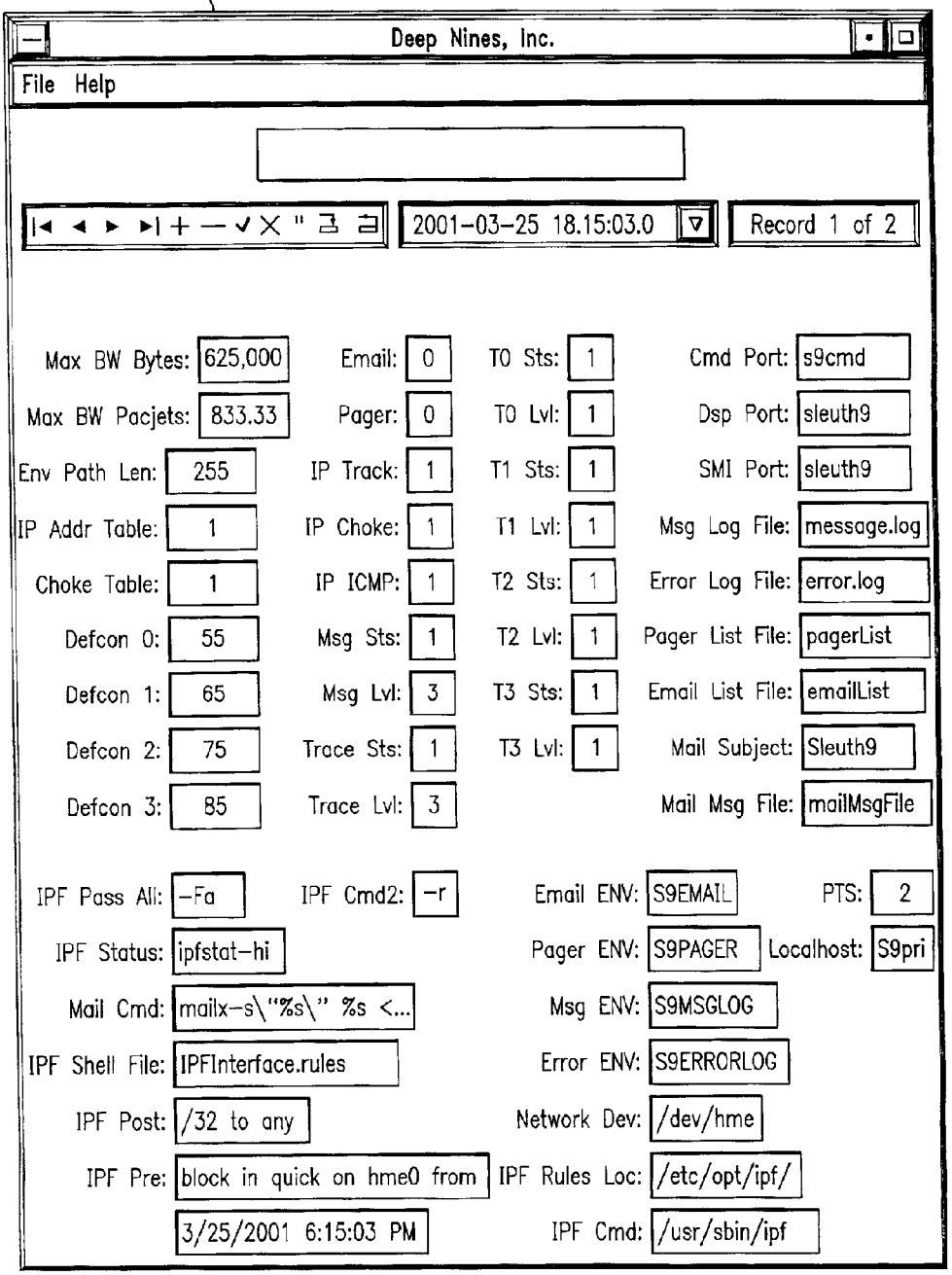

FIG. 8, shows visual management tool 800 for the system configuration database demonstrating a pull down menu of multiple configurations. The system can store as many different configurations in the database as a company would like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A traffic management system for use in conjunction with packet data, said system operative for passing data packets there through, said system comprising:
    means for reviewing certain parameters of data which is flowing into said system;
    means for remembering for a period of time said reviewed certain parameters in conjunction with each received packet; and
    means operative upon attainment of packet flow volume into said system reaching a certain level for temporarily storing certain subsequently received packets in accordance with selective remembered parameters of previously received packets.

2. The traffic management system of claim 1 wherein said certain level is user controlled.

3. The traffic management system of claim 1 wherein said certain level includes a plurality of levels, wherein the attainment of each successive level results in a more stringent application of said remembered certain parameters.

4. The traffic management system of claim 1 wherein said temporary storing means including a cache and a data storage, said data storage used when said cache is full.

5. The traffic management system of claim 1 wherein said remembered parameters include one or more of: a sender's address; a prior trouble-causing address; a notice of a potential trouble address; amount of data transmitted from a particular address in a period of time; number of packets arriving from a particular address in a period of time; an address' domain name; date of initial encounter with an address; date of latest encounter with an address.

6. The traffic management system of claim 1 further including means for retrieving said temporarily stored data packets when traffic flow into said system falls below said certain level; and
    means for putting said retrieved data packets through said system.

7. The traffic management system of claim 6 wherein said retrieving means includes means for retrieving packets in an order based upon why said packets had been stored.

8. The traffic management system of claim 1 further comprising means for dynamically displaying information pertaining to temporarily stored ones of said data packets.

9. The traffic management system of claim 8 further comprising means for transmitting said display information to a remote location.

10. The traffic management system of claim 8 wherein displaying means includes means for displaying data selected from the list of; prioritized packets in PTS, user overrides of prioritized stored packets, threshold limits reduced thereby automatically releasing stored packets.

11. The method of claim 1 wherein said data is flowing into said system from a public network and directed to a particular address on said network.

12. The method of claim 1 wherein said data is flowing into said system from a particular address on a public network, said data destined for an address on said public network.

13. A traffic management system for use in conjunction with packet data, said system operative for passing data packets there through, said system comprising:
    means for reviewing certain parameters of data which is flowing into said system;
    means for remembering for a period of time said reviewed certain parameters in conjunction with each received packet, wherein said remembered parameters include one or more of: a sender's address; a prior trouble-causing address; a notice of a potential trouble address; amount of data transmitted from a particular address in a period of time; number of packets arriving from a particular address in a period of time; an address' domain name; date of initial encounter with an address; date of latest encounter with an address:
    means operative upon attainment of packet flow volume into said system reaching a certain level for temporarily storing certain subsequently received packets in accordance with selective remembered parameter of previously received packets; and
    wherein said certain level includes a plurality of levels arranged in a sequence, and wherein as the sequence of levels gets closer to an absolute maximum data flow rate more and more of said remembered parameters are included as a basis for said determination to temporarily store a particular packet.

14. The traffic management system of claim 13 further including means for arbitrarily selecting packets for temporary storing when said data flow rate reaches its maximum capacity.

15. A data network monitoring system comprising:
    at least one data sniffer;
    a temporary storage device;
    a processor for performing data throughput measurements on data passing through said system; and
    said processor further operative for diverting to said temporary storage device selected data entering said system, said selected data controlled in part by information obtained from said data sniffer and from said throughput measurement means.

16. The data network monitoring system of claim 15 wherein said system further comprises a store of data having undesirable characteristics, and wherein said processor operates to compare said store of undesirable data with data obtained from said data sniffer.

17. The data network monitoring system of claim 15 wherein said processor increases the number of said selected packets so as to maintain system throughput at or below a maximum number, where said maximum number is below the limits of the data transmission media entering said system.

18. The data network monitoring system of claim 15 further comprising means operable upon a determination that the data throughput through said system is below a certain limit for allowing certain ones of said diverted data to pass through said system.

19. The data network monitoring system of claim 15 further comprising a display for displaying in real time certain parameters pertaining to system operation.

20. The data network monitoring system of claim 15 wherein said parameters are selected from the list comprising: Preset Threshold Limits; Bandwidth Capacity; Allowed IP Addresses; Disallowed IP Addresses; and Prioritized Packets.

21. The data network of claim 15 wherein said data which is diverted by said processor may originate at a specific site and destined for a public network or may originate at a location connected to the public network and destined for said specific site.

22. The method of controlling a traffic management system, said method comprising the steps of:

reviewing certain parameters of data packets flowing into said system;

remembering for a period of time said reviewed certain parameters in conjunction with each received data packet; and upon attainment of packet flow volume into said system reaching a certain level, temporarily storing certain subsequently received packets in accordance with selective remembered parameter of previously received packets.

23. The method of claim 22 wherein said certain level is user controlled.

24. The method of claim 22 wherein said certain level includes a plurality of levels, wherein the attainment of each successive level results in a more stringent application of said remembered certain parameters.

25. The method of claim 22 wherein said remembered parameters include one or more of: a sender's address; a prior trouble causing address; a notice of a potential trouble address; amount of data transmitted from a particular address in a period of time; number of packets arriving from a particular address in a period of time; an address' domain name; date of initial encounter with an address; date of latest encounter with an address.

26. The method of claim 25 wherein said certain level includes a plurality of levels arranged in a sequence, and wherein as the sequence of levels gets closer to an absolute maximum data flow rate more and more of said remembered parameters are included as a basis for said determination to temporarily store a particular packet.

27. The method of claim 26 further including the step of:

arbitrarily selecting packets for temporary storing when said data flow rate reaches its maximum capacity.

28. The method of claim 22 further including the step of:

retrieving said temporarily stored data packets when traffic flow into said system falls below said certain level.

29. The method of claim 28 further including the step of:

putting said retrieved data packets through said system.

30. The method of claim 22 further comprising the step of:

dynamically displaying information pertaining to temporarily stored ones of said data packets.

31. The method of claim 30 wherein said displaying step includes:

transmitting said display information to a remote location.

32. The method of claim 30 wherein said displaying step includes displaying data selected from the list of; prioritized packets in PTS, user overrides of prioritized stored packets, threshold limits reduced thereby automatically releasing stored packets.

33. The method of claim 22 wherein said data packets flowing into said system may come from a public network or may come from a specific system.

34. A data flow control system for preventing an enterprise data processing system from being overloaded with data requests directed to said enterprise system from sources external to said enterprise system, said data flow system comprising:

a gateway for accepting data directed to said enterprise system from any said external source;

a data monitoring circuit for observing selected portions of certain data directed to said gateway, and a delay path operable when the amount of data currently being handled by said enterprise system reaches a certain threshold for temporarily removing selected data which is directed to said enterprise system away from enterprise system.

35. The system of claim 34 wherein the exact ones of said data which are temporarily removed are selected under control of information provided by said data monitoring circuit.

36. The system of claim 34 wherein said certain threshold has gradations and wherein the amount and types of data that are temporarily removed operate in proportion to said gradations.

37. A method for preventing data from flowing beyond a particular point faster than the handling capability associated with that point; said method comprising the steps of:

remembering certain parameters of data passing said particular point; and preventing selected data from passing said particular point when the data handling capability associated with that point reaches a preset limit, said preventing step relying, in part, on said remembered parameters pertaining to data previously passing said particular point.

38. The method of claim 37 wherein said preventing step includes the step of storing said selected data for a period of time.

39. The method of claim 38 further including the step of selectively sending at least portions of said stored data to pass through said particular point.

40. The method of claim 37 wherein said preset limit is selected from the list of:

prior trouble causing addresses;

a notice of potential trouble addresses;

an amount of data transmitted from a particular address in a period of time;

number of data packets arriving in a period of time;

number of data packets arriving in a period of time from a particular sending address;

identified questionable changes in a specific sender address.

41. The method of claim 37 further including the step of sending messages to an external location indicating the steps of data flow through said particular point.

* * * * *